(12) United States Patent
Hahn et al.

(10) Patent No.: US 11,772,836 B2
(45) Date of Patent: Oct. 3, 2023

(54) COMMUNICATIONS AND OPEN-LOOP/CLOSED-LOOP CONTROL SYSTEM FOR A FILLING SYSTEM

(71) Applicant: KRONES AG, Neutraubling (DE)

(72) Inventors: Wolfgang Hahn, Neutraubling (DE); Timo Pronold, Wiesent (DE)

(73) Assignee: KRONES AG, Neutraubling (DE)

( * ) Notice: Subject to any disclaimer, the term of this patent is extended or adjusted under 35 U.S.C. 154(b) by 65 days.

(21) Appl. No.: 17/262,188

(22) PCT Filed: May 24, 2019

(86) PCT No.: PCT/EP2019/063525
§ 371 (c)(1),
(2) Date: Jan. 21, 2021

(87) PCT Pub. No.: WO2020/020515
PCT Pub. Date: Jan. 30, 2020

(65) Prior Publication Data
US 2021/0292025 A1 Sep. 23, 2021

(30) Foreign Application Priority Data
Jul. 26, 2018 (DE) ..................... 10 2018 212 503.1

(51) Int. Cl.
*B65B 57/00* (2006.01)
*G05B 13/02* (2006.01)

(52) U.S. Cl.
CPC ............ *B65B 57/00* (2013.01); *G05B 13/027* (2013.01)

(58) Field of Classification Search
USPC .......................................................... 53/131
See application file for complete search history.

(56) References Cited

U.S. PATENT DOCUMENTS

2009/0088875 A1    4/2009   Baier et al.
2013/0184839 A1    7/2013   Bauer et al.
(Continued)

FOREIGN PATENT DOCUMENTS

DE           4442586 A1    6/1996
DE   202004012848 U1    3/2005
(Continued)

OTHER PUBLICATIONS

ISA European Patent Office, International Search Report Issued in Application No. PCT/EP2019/063525, dated Aug. 29, 2019, WIPO, 6 pages.
(Continued)

*Primary Examiner* — Chinyere J Rushing-Tucker
(74) *Attorney, Agent, or Firm* — McCoy Russell LLP (57) ABSTRACT

The present invention relates to a communication and open-loop/closed-loop control system for at least one filling system, said filling system comprising a machine with a software communication robot, in particular a chatbot, which is configured to recognize voice input and/or text input by an operator; and an open-loop/closed-loop control device which is connected to the software communication robot for data communication and is configured to control the machine of the filling system in an open-loop/and/or closed-loop manner on the basis of the voice input and/or text input recognized by the software communication robot.

12 Claims, 3 Drawing Sheets

(56) References Cited

U.S. PATENT DOCUMENTS

| | | | |
|---|---|---|---|
| 2014/0298100 A1* | 10/2014 | Grimm | G05B 23/0235 |
| | | | 714/37 |
| 2018/0046164 A1 | 2/2018 | Drees | |
| 2018/0129181 A1 | 5/2018 | Kratzer, III et al. | |
| 2020/0115087 A1* | 4/2020 | Hagestedt | B65B 59/001 |

FOREIGN PATENT DOCUMENTS

| | | |
|---|---|---|
| DE | 102009040977 A1 | 3/2011 |
| DE | 102015204922 A1 | 9/2016 |
| EP | 2218664 A2 | 8/2010 |
| JP | 2004164024 A | 6/2004 |
| JP | 2015182792 A | 10/2015 |
| JP | 2015182794 A | 10/2015 |
| WO | 2018127827 A1 | 7/2018 |

OTHER PUBLICATIONS

Japanese Patent Office, Office Action Issued in Application No. 2021-502974, dated Jan. 4, 2023, 5 pages.

\* cited by examiner

COMMUNICATIONS AND OPEN-LOOP/CLOSED-LOOP CONTROL SYSTEM FOR A FILLING SYSTEM

CROSS REFERENCE TO RELATED APPLICATIONS

The present application is a U.S. National Phase of International Application No. PCT/EP2019/063525 entitled "COMMUNICATIONS AND OPEN-LOOP/CLOSED-LOOP CONTROL SYSTEM FOR A FILLING SYSTEM," and filed on May 24, 2019. International Application No. PCT/EP2019/063525 claims priority to German Patent Application No. 10 2018 212 503.1 filed on Jul. 26, 2018. The entire contents of each of the above-listed applications are hereby incorporated by reference for all purposes.

TECHNICAL FIELD

The present invention relates to the field of filling systems and, in particular, to controlling filling systems in an open-loop/closed-loop manner with the aid of operating devices.

BACKGROUND AND SUMMARY

Filling systems for beverages or the like comprise several production units connected in series, such as filling machines, labeling machines and packaging machines. As described for example, in DE 10 2009 040 977 A1, they can be at least in part be configured as rotary machines that are coupled to one another by way rotating transfer devices. Alternatively, the production units can also be configured as inline units and/or be connected to one another by way of linear transport devices, distribution devices, and product buffers. Respective system concepts are described, for example, in DE 4 442 586 W4, DE 20 2004 012 848 U1, and EP 2 218 664 A2.

Nowadays, a filling system is generally operated using a touch screen through which instructions for controlling individual machines in the filling system in an open-loop/closed-loop manner can be entered by an operator. Authentication of the operator may need to be necessary, for example, by way of a transponder on which the operator's identity is encoded, in order to ensure that only those operations for which the operator is authorized are carried out in response to inputs from the operator. Confirmations of inputs by the operator and information about the operating state or operating faults can be displayed on the touch screen.

Operating measures suitable for operation via such a touch screen, however, requires correspondingly well-founded training, experience and current concentration of the operator in order to achieve a desired operation. The object therefore arises to simplify the current operating of a filling system so that suitable operation is achieved more reliably and faster.

The above-mentioned object is satisfied by a communication and open-loop/closed-loop control system for at least one filling system (in particular for filling beverages; several systems can also be provided possibly disposed next to one another), where the filling system comprises a machine with a software communication robot, in particular a chatbot, which is configured to recognize voice input and/or text input by an operator and/or to output or display information about the operating status of the machine;

an open-loop/closed-loop control device which is connected with the software communication robot for data communication and is configured to control the machine in an open-loop and/or closed-loop manner on the basis of the voice input and/or text input recognized by the software communication robot.

The machine mentioned can be, for example, a filling machine, a labeling machine, a packaging machine, a direct printing machine, or a blow-molding machine A transport device/transport path can presently likewise be covered by the term machine. The term open-loop/closed-loop control system is presently understood to mean an open-loop and/or a closed-loop control system. The open-loop/closed-loop control system can be part of a central open-loop/closed-loop control system of the entire filling system which controls all machines in an open-loop/closed-loop manner. The software (software-implemented) communication robot can at least in part be situated at one of the machines of the filling system and can be or comprise a chatbot. In particular, the software communication robot can comprise or be connected to a display device and it can comprise or be connected to a voice output. A dialogue with an operator can be conducted via such a voice output. The software communication robot can be implemented in a central processing unit of the filling system. In any case, it receives voice input recorded by a microphone or text input from an operator.

The chatbot is a computer-implemented dialog system with which communication via text input or voice is possible, so that it intelligently supports the operator in operating a machine in the filling system. In general, the software communication robot significantly simplifies operating the filling system over known prior art touch screen terminals. In particular, the software communication robot can comprise a voice recognition module that allows for the recognition of text and/or (spoken) voice input in several languages or dialects so that the operator can operate the filling system in his preferred language. Furthermore, the software communication robot can be configured to question input and to show solutions for desired operations or problems mentioned by the operator or problems that have been recognized independently.

Furthermore, the software communication robot can be configured to present diagnostic information. A software communication robot that is positioned at a specific machine of the filling system or is logically associated with the machine, respectively, can there also present data relating to the operational procedure of another machine in the filling system. The data can be presented via a display device provided on or at the machine, via which information can generally be presented inter alia with the aid of virtual reality or augmented reality applications. The information can also be output via voice output. In order to increase the intelligibility of the information output via synthetic voice output, the voice output can take place over a headset worn by the operator. Information/data can also be presented using a mobile operating device and/or a smartphone.

The software communication robot can initiate operating processes through data communication with the open-loop/closed-loop control device of the filling system in response to a dialogue with the operator.

The software communication robot can comprise a speaker recognition module that is used in particular for speaker identification. It can also be used for speaker verification, i.e. verifying the identity of a speaker predetermined by an operator. The software communication robot can recognize an operator using the speaker recognition module and can then adapt the dialogue with the recognized operator to the latter. For example, the dialog with an operator who is recognized as being an experienced operator will differ in terms of the complexity and details from a dialog with another operator who is recognized as being a less experienced operator. The dialogue can therefore be suitably adapted to the training or experience of the operator. The dialogue can also be adapted to the competence of the operator recognized, so that it can be prevented that the operator attempts initiating an operation for which he is not authorized.

The software communication robot can also be in data communication with an, in particular mobile, collaborative robot of the filling system, for example in radio communication or via an intranet, in order to issue instructions to it in response to a dialog with the operator. Furthermore, the software communication robot can be configured to communicate, via a communication network and in response to a dialogue with the operator, with one or more other operators who are remote from the operator being in dialogue with the software communication robot.

The software communication robot can be equipped with or in communication with an artificial intelligence (AI) module, with the aid of which it can learn. For example, after recognizing an operator with the aid of the speaker recognition module mentioned above, the software communication robot can deduce the level of experience/training of the operator from the dialog behavior of the operator that develops over time and adapt his own dialog behavior according to the learning result. In this way, an operator profile of an operator can be dynamically managed, stored, and used for learning. The operator profile can contain data on the qualifications and competencies of the operator which determine to what extent the operator may have influence on the operation of which machines and components of the machines. The operator profile can also be used for voice recognition of voice input by an operator. The AI module can also be used to learn/train the above voice recognition and speaker recognition.

The AI module can be configured for machine learning and can be or comprise an artificial neural network. Learning can be based at least in part on fuzzy logic. The artificial neural network can be a neuro-fuzzy network. The combination of fuzzy controllers with neural networks enables the automatic adaptation or generation of the fuzzy rules according to which learning and dialogue with an operator can take place.

Furthermore, a filling system with a communication and open-loop/closed-loop control system according to one of the examples described above is presently provided. In principle, each machine of the filling system, for example a filling machine, a closing machine, a labeling machine, a blow-molding machine, and a packaging machine, can be equipped with a software communication robot or chatbot, respectively, and the individual software communication robots or chatbots, respectively, can be networked with one another.

Embodiments of a method according to the invention are described hereafter with reference to the drawings. The embodiments described are to be considered in all aspects as being only illustrative and not restrictive and various combinations of the features specified are comprised by the invention.

DETAILED DESCRIPTION

The present invention relates to operating machines in a filling system. According to the invention, the machines are operated by an operator by way of text or voice input into a software communication robot. Furthermore, a chatbot is to be representative of such a software communication robot, although any implementation of a software communication robot is included in this description. The chatbot can be programmed at least in part in C++ or Python.

Figure 1:
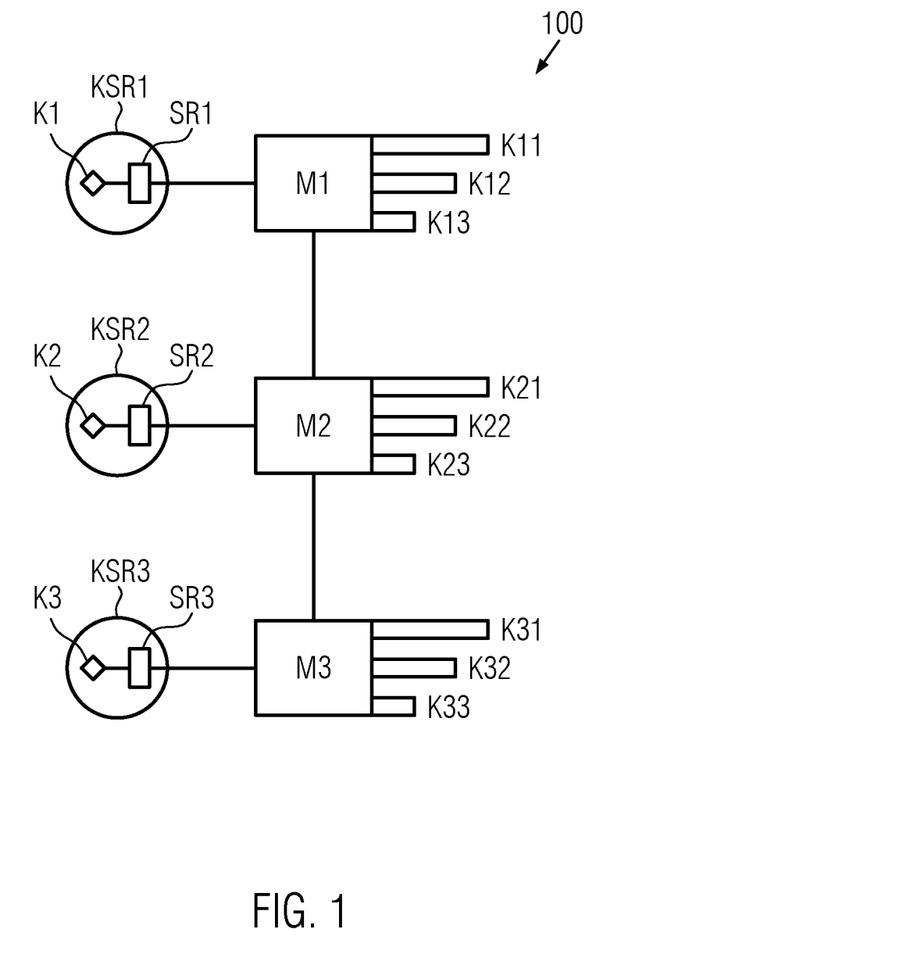
FIG. 1 schematically shows communication and open-loop/closed-loop control systems in connection with machines of a filling system according to an example of the present invention.

FIG. 1 schematically shows a line of a filling system 100 comprising a number of machines M1, M2 and M3. The machines each have components K11, K12 and K13 or K21, K22 and K23 or K31, K32 and K33, respectively, for example, for processing bottles or preforms, by way of which they can process containers. A first open-loop/closed-loop control system KSR1 is in communication with first machine M1 for data exchange, a second open-loop/closed-loop control system KSR2 is in communication with second machine M2 for data exchange, and a third open-loop/closed-loop control system KSR3 is in communication with third machine M3 for data exchange. Each of open-loop/closed-loop control systems KSR1, KSR2 and KSR3 can also receive data from any machine M1, M2 and M3, for example, via a connection between machines M1, M2, M3 among each other or via a higher-level data system in which data regarding all machines M1, M2, M3 is received. Open-loop/closed-loop control systems KSR1, KSR2 and KSR3 can also be interconnected for data exchange.

Communication and open-loop/closed-loop control system KSR1 comprises an open-loop/closed-loop control system SR1 in connection with machine M1 for controlling the same and a chatbot K1 in an open-loop/closed-loop manner, communication and open-loop/closed-loop control system KSR2 comprises an open-loop/closed-loop control system SR2 in connection with machine M2 for controlling the same and a chatbot K2 in an open-loop/closed-loop manner, and communication and open-loop/closed-loop control system KSR3 comprises an open-loop/closed-loop control system SR3 in connection with machine M3 or controlling the same and a chatbot K3 in an open-loop/closed-loop manner. Chatbot K1 is in communication with open-loop/closed-loop control system SR1, chatbot K2 is in communication with open-loop/closed-loop control system SR2, and the chatbot K3 is in communication with the open-loop/closed-loop control system SR3. An operator can operate one of machines M1, M2 and M3 by way of one of chatbots K1, K2 and K3. Each of the chatbots can be implemented in communication configuration 200 shown in FIG. 2.

Each of open-loop/closed-loop control systems SR1, SR2 and SR3 can be part of a central open-loop/closed-loop control system. Each of open-loop/closed-loop control systems SR1, SR2 and SR3 in particular does not have to be physically placed at one of machines M1, M2, M3. Each of open-loop/closed-loop control systems SR1, SR2 and SR3 is at least logically assigned to one of the machines.

Figure 2:
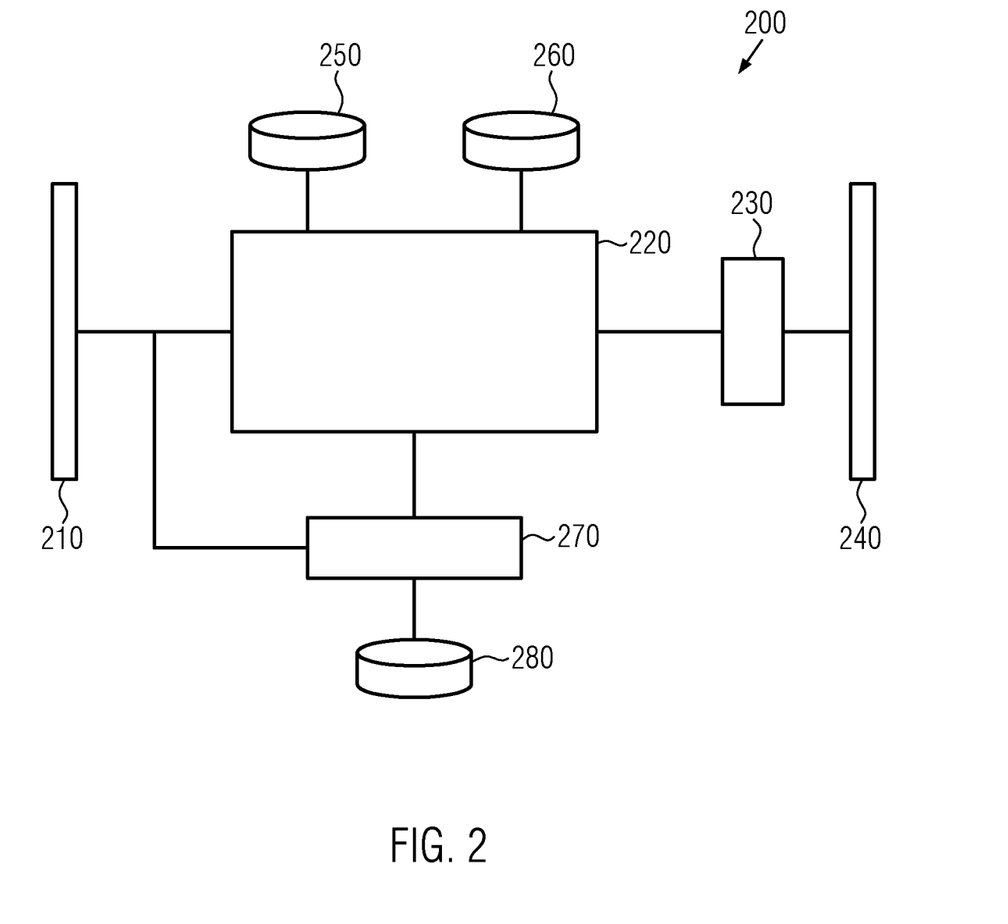
FIG. 2 shows a block diagram illustrating a communication configuration in which a software communication robot can be implemented, that can be used, for example, to operate a machine in a filling system.

Communication configuration 200 shown in FIG. 2 comprises an input interface 210. Input interface 210 receives data representing voice input of an operator which is recorded by a microphone (not shown). Alternatively, input interface 210 can receive text data. It can be configured as a combined software and hardware interface This data is sent from input interface 210 to a (data) processing unit 220. Processing unit 220 can be part of a processing unit which is central to the filling system and which can comprise different processing units for different machines. Processing unit 220 can comprise a processor for processing data. Communication configuration 200 also comprises an output unit 230 and an output interface 240. Voice output is generated via output unit 230 and can be output via output interface 240 and a loudspeaker (not shown) for dialog with the operator. Output interface 240 can likewise be configured as a combined software and hardware interface.

Processing unit 220 can be configured to carry out speaker recognition on the basis of the data received from input interface 210. Furthermore, the semantic content of the voice input is determined by central processing unit 220. Determining the semantic content and speaker recognition can take place with the aid of one or more language models or semantic models, respectively, that are stored in a model memory 250. When determining the semantic content, a probability that certain words appear in a certain order can be taken into account. The semantic model can be implemented in the form of a neural network or a Bayesian classifier. The dialogue with an operator carried out with the aid of output unit 230 is conducted on the basis of a dialogue model which is stored in a dialogue model memory 260. In particular, processing unit 220 can be configured to recognize voice input in several languages and/or dialects, where different models for the different languages or dialects need to be provided in model memory 250. A self-learning chatbot can be implemented in communication configuration 200 shown in FIG. 2. The learning process takes place with the aid of a training unit 270 which collects and evaluates data and stores received voice data and recognized semantic contents in a memory 280 Furthermore, an operator profile of an operator can be stored and updated in memory 280. For example, it can be learned how the level of knowledge of an operator, identified with the aid of speaker recognition, changes over time, and the dialogue with this operator controlled by processing unit 220 can be adapted to the changing level of knowledge of the operator over time. If the operator still needed a relatively narrow, detailed dialog at an early stage for initiating a desired operation of a machine, then the dialog can possibly be shortened at a later time due to the operator's increased level of knowledge, thereby enabling the machine to be operated faster. The operator profile can also be taken into account when determining the semantic content of the voice input.

Dynamic learning to conduct the dialog of a chatbot can take place with the aid of artificial intelligence implemented in communication configuration 200. Artificial intelligence can also be used for voice recognition of voice input or speaker recognition/identification/verification. Artificial intelligence can be implemented in the form of neural networks. Neural networks can be understood to mean tools that are suitable to simulate any non-linear functions and therefore also rules, for example, of fuzzy logic, if these functions are available on the basis of examples. Regularities and therefore weighting of the neural networks can be learned/trained from a large number of examples which are then expressed with the aid of predetermined but also again adaptable rules, for example, fuzzy quantities and rules. The combination of fuzzy controllers with neural networks allows for establishing and parameterizing fuzzy rules in an intelligent learning-related manner.

In fuzzy theory, a rule, more precisely a linguistic rule, comprises a number of premises in the form of a membership of a number of input variables to a number of linguistic values which are linked to one another by logical operations, the so-called precondition of the rule, and an action in the form of a membership function of an output variable to a linguistic value (generally referred to as the 'if-then' form). Each rule can in principle be predetermined by an expert and/or learned using an automated method. The automated method can be carried out in particular with the aforementioned artificial neural network. A predetermined or learned rule can be further adapted through optimization steps. An optimization step can comprise the adaptation of the above-mentioned parameters of a fuzzy quantity associated with a linguistic value used in a rule or a prioritization or elimination of the rule. Prioritization or elimination can take place in particular by setting or adjusting weightings of a rule when determining a total membership function according to the invention on the basis of the resulting membership function of the action of the rule.

The logical operation of two or more linguistic values can be effected using the usual logical operators, in particular AND, OR and XOR. Binary, ternary or operators with more than three operands can there be employed. In addition, the unary operation of negation can be applied to any linguistic value.

When two or more linguistic values of the premises of a rule are logically ANDed, the degree of the precondition of the rule can in particular be formed by the minimum of the degrees of membership of the input variables to their corresponding linguistic values. When two or more linguistic values of the premises are logically ORed, the degree of the precondition can in particular be formed by the maximum of the degrees of membership of the input variables to their corresponding linguistic values. Alternatively, the logical AND operator and/or the logical OR operator can be executed using limited sums.

Determining a resulting membership function of an action of a rule is effected by allocating the degree of the precondition of the rule, i.e. the logically connected premises, the 'if' part of the rule, to the linguistic value of the action of the rule, the 'then' part the rule. This allocation, also referred to inference, can be effected by forming the minimum between the degree of the precondition and the membership function of the action, i.e. by graphically "truncating" the membership function of the action at the level of the degree of the precondition. As an alternative to this, the allocation can be effected by forming a product between the degree of the precondition and the membership function of the action.

A rule can contain two or more premises, therefore two or more linguistic values, as preconditions. Two or more linguistic values can be equal. Alternatively or in addition, two or more process variables being part of the linguistic values of the precondition can be equal.

Determining n total membership function on the basis of the first resulting membership function of the action of the at least first predetermined rule can in particular take place by equating the total membership function with the resulting first membership function of the action. The resulting first membership function can additionally be modified by weighting, in particular by multiplication with a weighting function over the range of an output variable of the action of the rule, and/or by truncating the value range of the output variable at predetermined limits.

Obtaining an output variable (defuzzification) from the total membership function can be effected in particular by determining the abscissa value of the center of gravity of the area disposed below the total membership function. Alternatively, any value of the output variable for which the total membership function has a maximum can be selected according to the max criterion method. Likewise, the mean value over the set of values of the output variable for which the total membership function assumes its (global) maximum can be selected according to the mean-of-maxima method as the value of the output variable.

In combined neuro-fuzzy systems, a distinction must be made between cooperative or offline systems and hybrid or online systems, respectively, both of which can be implemented in communication configuration 200. In the first-mentioned systems, the neural networks are newly trained offline at certain time intervals, i.e. not during operation. In the case of hybrid systems, training takes place during production operations. It can be useful in particular, but by no means exclusively, for these systems to only allow the process parameters to be controlled within previously determined lower and upper limits.

Furthermore, a virtual reality or augmented reality output can be presented to the operator via output unit 230 and a corresponding formation of output interface 240, in particular, via a display device not shown in FIG. 2. The virtual reality or augmented reality output can be used both to support the dialog with the operator and to display diagnostic and other operational data. The virtual reality or augmented reality output can contain, in particular, a simulated animated display of information, for example, about the operational processes of machines in the filling system.

Figure 3:
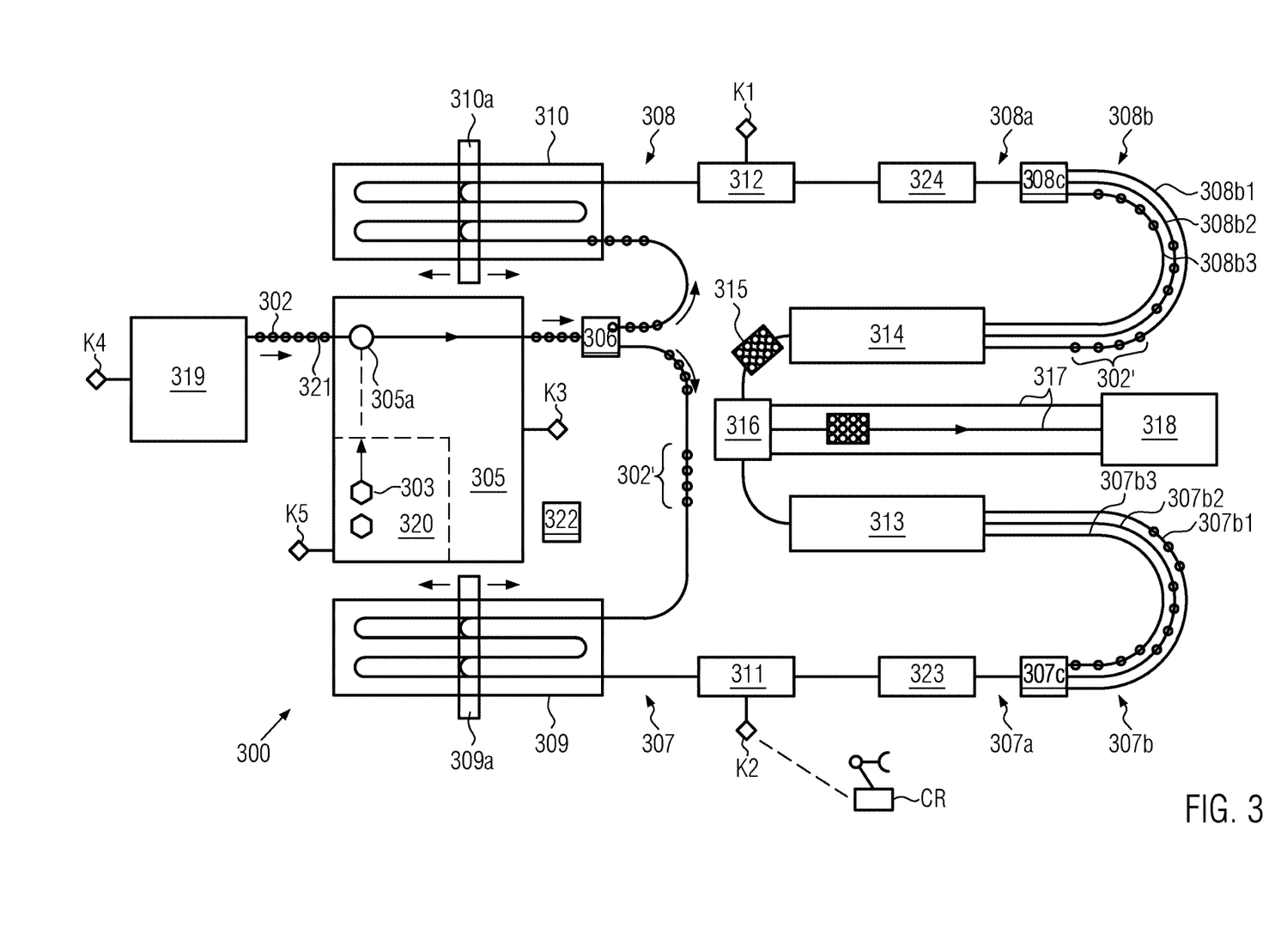
FIG. 3 shows an exemplary filling system that can be operated with the aid of a communication and open-loop/closed-loop control system according to the invention.

An elaborate filling system 300, which can be operated with the aid of communication and open-loop/closed-loop control systems KSR1, KSR2 and KSR3 shown in FIG. 1, is shown by way of example in FIG. 3. Filling system 300 for filling containers 302, 303 with a liquid product, such as a beverage or the like, comprises a filling machine 305 for filling and closing containers 302, 303 and a distribution device 306 provided downstream of filling machine 305 for distributing containers 302, 303 onto two separately controllable transport paths 307, 308, in each of which at least one container buffer 309, 310 with adjustable container guides 309a, 310a is provided. Disposed downstream of container buffers 309, 310 are labeling machines 311, 312 and packaging machines 313, 314 for producing container packages 315. They are supplied to a collecting and distributing device 316 so that container packages 315 are distributed onto sorting lanes 317 provided downstream of collecting and distributing device 316 and can be supplied to a picking device 318.

Transport paths 307, 308 each comprise first sections 307a, 308a on the inlet side which are each single-track and configured for pleasureless transportation of containers 302, 303. Furthermore, transport paths 307, 308 each comprise seconds sections 307a, 308a on the outlet side which are each multi-track and configured for pleasureless transportation of containers 302, 303. Track switches 307c, 308c or respective distribution facilities are provided for the distribution of containers 302, 303 from single-track first section 307a, 308a to the individual lanes of second section 307b, 308b, which are configured for example in the form of separate lanes 307b1 to 307b3, 308b1 to 308b3.

Furthermore, filling system 300 comprises a blow-molding machine 319, 320. In the example shown, separate blow-molding machines 319, 320 are provided for producing different containers 302, 303, for example, containers having different geometric shapes. At least one of blow-molding machines 319, 320 can be connected to filling machine 305b via a transport path 321 on the inlet side. Different incoming container flows can be supplied via a track switch 305a on the inlet side for further processing. Further production units 323, 324 can be provided, for example, in the form of shrink tunnels.

A central open-loop/closed-loop control unit 322 is provided for controlling filling system 300 according to the invention and is in communication in particular with distribution device 306, container buffers 309, 310, labeling machines 311, 312, and production units upstream of distribution device 306, such as filling machine 305 and blow-molding machines 319, 320. Open-loop/closed-loop control systems KSR1, KSR2 and KSR3 or chatbots K1, K2, K3 shown in FIG. 1 can be part of central open-loop/closed-loop control unit 322. Implementations with central and distributed data processing are possible.

In the example shown, labeling machines 311, 312 are connected to chatbots K1, K2, filling machine 305 to chatbot K3, and blow-molding machines 319, 320 to chatbots K4, K5. Chatbots K1, K2, K3, K4 are logically associated with the respective machines of filling system 300. Of course, all machines of filling system 300 can be equipped with chatbots and the chatbots can be networked with one another so that they can exchange information about the operating states of the machines and the requirements of the operators. For security reasons, networking the chatbots with the other machines, mobile collaborative robots, but also the smartphones of the operators, etc. can in general be limited to a defined internal region (for example, in the form of a company's own network) and exchange on the Internet for independent learning by the chatbot, for example, with regard to voice recognition or speaker identification) can be enabled at the same time.

Central open-loop/closed-loop control unit 322 is connected to the chatbots and can at least in part assume the coordination of the machines and the transport technology, for example, when organizing the system production and changing the type of products. Each machine can be logically and/or physically associated with a communication and open-loop/closed-loop control system with a chatbot and an open-loop/closed-loop control device. An operator can operate the respective machines by way of chatbots K1, K2, K3, K4, K5 using voice input and voice dialog. The chatbots can use display devices positioned at the machines to display information.

Chatbots K1, K2, K3, K4, K5 can question the operator's input, submit solutions for problems presented or recognized, or also initiate specific action. For example, each of chatbots K1, K2, K3, K4, K5 can be configured to call in a further operator for support (depending on the qualification or for faster implementation/removal, for example, of setup processes or faults) in response to a dialog with an operator or to request a suitable free mobile collaborative robot and to directly assign it a specific action (in FIG. 3, for example, chatbot K2 is connected to a collaborative robot CR). Furthermore, chatbots K1, K2, K3, K4, K5 can be configured to automatically end, prepare, and start production as well as organize the material flow accordingly by way of an open-loop/closed-loop control device, for example, with the aid of central open-loop/closed-loop control unit 322 and communicate to the operator what tasks need to be done. It would also be possible to change an already initiated termination of production so that the termination does not have to be carried out first and a restart has to be carried out thereafter. Production extended in time in an automated manner would also be conceivable for the reason that, for example, a new order for the product has been received at short notice and the materials required for production are available or can be reordered in good time. One reason for longer or shorter production times could also be the receipt or the lack of receipt of empties (for example from the beverage trade industry), which can be delivered at short notice and supplied or not supplied to filling system 300.

Other types of operating support that can be provided by chatbots K1, K2, K3, K4, K5 are a dialogical clarification with the operator about exactly which other product is to be produced in which quantity before switching production to another product, or the output of information to the operator about which tasks have to be carried out in which order for the production of a new product (for example cleaning and maintenance processes, general changeover processes such as change of material, change of format parts, settings, etc.).

Furthermore, operating support can be provided by chatbots K1, K2, K3, K4, K5 in that automatic partial processes such as cleaning/sterilization etc. are started in the correct sequence and/or in a predetermined time interval without renewed acknowledgement by the operator, that changeover parts and tools/materials required for a changeover process are ordered and made available by cobots, automated guided vehicles, or forklift drivers, that documents, animations, or videos are offered and presented for the tasks currently to be performed by the operator, that the location for the respective task to be performed is visually displayed at the machine, or that malfunctions are displayed during a process at the machine or in the system, that recommendations for eliminating or for managing the fault are issued.

The respective presentation of information/data can there also take place via a mobile control device and/or a smartphone.

In general, the expected states of filling system 300, for example, foreseeable/predictable stops or necessary interventions, for example, accompanied by voice output, can be displayed Preventive measures, for example, to avoid stops or malfunction, CIP or cleaning processes, and intermediate disinfections in aseptic systems, etc., can also be recommended and/or directly initiated.

Prior to the start of production (e.g. also prior to starting the shift, preparatory actions such as heating up Reima, a pasteurizer and a heater, heating tunnels for shrink sleeves or shrink packs, etc. could be triggered in an automated manner and, if necessary, suitable packaging material be made available. For this purpose, a dialogue with the operator can take place in advance, in which, for example, at the end of the shift in the evening/on the weekend, a question is asked about the start of the shift next morning/on Monday (for example: "When should the system/machine be ready for production?").

Other possible applications pertain to:

the automated conversion of production to energy and media efficiency and/or to scheduled/fast order processing, the consideration of the availability of operators, for example during breaks, personal distribution times, etc. The operator could there report as "not available" by voice input and possibly also by way of a mobile device such as a smartphone, the recognition of operator changes (e.g. when changing shifts) as well as derivation of measures, the provision of information about the current situation of the system and upcoming actions, etc, the detection of production interruptions and possibly inquiries in dialogue with the operator about how long the system is likely to be down, Other operators could be informed about this, for example, to take a break, to carry out cleaning work or maintenance on machines. To reduce energy consumption, machines could also be switched off and switched on again in good time. Empirical values from previous comparable situations could be used for this purpose, the organization of the changeover processes of the system depending on the operators involved/available (with regard to qualifications, physical limitations, etc.) and the system status and cobots (their range, carrying load, etc.).

All of the above-mentioned operating support can be offered to the operator in a personalized manner based on a correspondingly created and updated operator profile, in particular depending on the level of knowledge and competence, since each chatbot can learn dynamically from the individual dialogues with the operator (see above).

Furthermore, the artificial intelligence implemented in communication configuration 200 (see FIG. 2) can learn in the course of regular use how long certain tasks, such as setting up and troubleshooting, actually last. For example, production planning is adjusted or suggestions are made to the shift supervisor on the basis of this data. Data such as stock levels and also the weather or ambient conditions (temperature, humidity, time, etc.) can also be incorporated into the optimization of the production data.

The invention claimed is:

1. Communication and open-loop/closed-loop control system for at least one filling system, said filling system comprising a machine with:
   a chatbot, which is configured to recognize voice input and/or text input by an operator and to output or display information about an operating status of said machine; and
   an open-loop/closed-loop control device which is connected with said chatbot for data communication and is configured to control said machine of said filling system in an open-loop and/or closed-loop manner on a basis of said voice input and/or text input recognized by said chatbot; and
   wherein the chatbot is configured to question input and to show solutions for desired operations or problems mentioned by the operator or problems that have been recognized independently.

2. The communication and open-loop/closed-loop control system according to claim 1 in which said open-loop/closed-loop control device is part of a central open-loop/closed-loop control device for controlling all machines of said filling system in an open-loop/closed-loop manner.

3. The communication and open-loop/closed-loop control system according to claim 1 in which said chatbot comprises a voice recognition module which is configured to recognize text and/or voice input in multiple languages and/or dialects.

4. The communication and open-loop/closed-loop control system according to claim 1 in which said chatbot is configured to provide diagnostic information about one or more machine of said filling system.

5. The communication and open-loop/closed-loop control system according to claim 1 in which said chatbot comprises a speaker recognition module.

6. The communication and open-loop/closed-loop control system according to claim 1, furthermore with an artificial intelligence, AI, module, with the aid of which said chatbot is configured to learn.

7. The communication and open-loop/closed-loop control system according to claim 6 in which said AI module is or comprises an artificial neural network.

8. The communication and open-loop/closed-loop control system according to claim 1, furthermore with a collaborative robot which is connected to said chatbot for data communication.

9. Filling system for filling a beverage with an open-loop/closed-loop control system according to claim 1.

10. The filling system according to claim 9 further comprising a filling machine, a labeling machine, a packaging machine, a direct printing machine, and a blow-molding machine, and where said filling machine, said labeling machine, said packaging machine, said direct printing machine, and/or said blow-molding machine is each equipped with an open-loop/closed-loop control system according to claim 1.

11. The communication and open-loop/closed-loop control system according to claim 1, wherein the chatbot is configured to initiate operating processes through data communication with the open-loop/closed-loop control device of the filling system in response to a dialogue with the operator.

12. Communication and open-loop/closed-loop control system for at least one filling system, said filling system comprising a machine with:
- a chatbot, which is configured to recognize voice input and/or text input by an operator and to output or display information about an operating status of said machine; and
- an open-loop/closed-loop control device which is connected with said chatbot for data communication and is configured to control said machine of said filling system in an open-loop and/or closed-loop manner on a basis of said voice input and/or text input recognized by said chatbot; and, wherein the chatbot comprises a speaker recognition module and is configured to recognize the operator using the speaker recognition module, adapt a dialogue with the recognized operator and initiate operating processes through data communication with the open-loop/closed-loop control device of the filling system in response to the adapted dialogue with the operator.

\* \* \* \* \*